United States Patent

[11] 3,592,459

[72] Inventors Werner Golter;
 Helmbrecht Muller, both of Pirmasens, Germany
[21] Appl. No. 791,916
[22] Filed Jan. 17, 1969
[45] Patented July 13, 1971
[73] Assignee Firma Schon & Cie. Gesellschaft Mit Beschrankter Haftung
 Pirmasens, Germany
[32] Priority Feb. 27, 1968
[33] Germany
[31] Sch 44345

[54] LARGE AREA OR CROSS-BEAM CUTTING MACHINE
12 Claims, 4 Drawing Figs.

[52] U.S. Cl. .................................................. 269/61, 83/437
[51] Int. Cl. ..................................................... B23q 5/22
[50] Field of Search ........................................... 269/56, 58, 59, 60, 61, 62; 214/1.6; 143/52-1, 108, 108-1,; 83/278, 437; 51/23.1

[56] References Cited
UNITED STATES PATENTS
2,334,023  11/1943  Mulholland ..................  51/231 X
FOREIGN PATENTS
30,080  1959  Finland .........................  143/108

Primary Examiner—Andrew R. Juhasz
Assistant Examiner—Donald D. Evenson
Attorney—Friedman & Goodman ABSTRACT: An improved large area or crossbeam cutting machine comprising a table-guiding frame with a crossbeam, a table movable along the frame and a drive unit therefor, the power takeoff of the drive unit interacting with a longitudinal drive element in which said drive unit is provided on said movable table so as to move in conjunction therewith and said longitudinal drive element is positioned on said table-guiding frame.

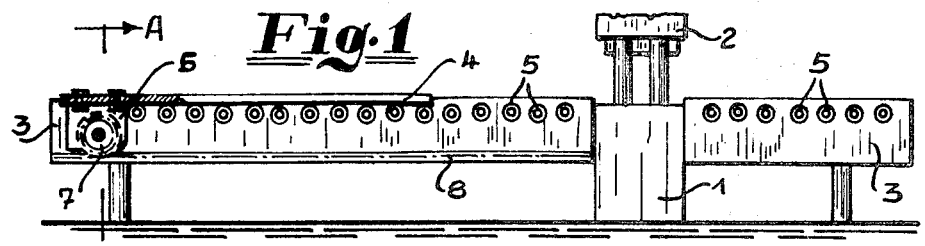
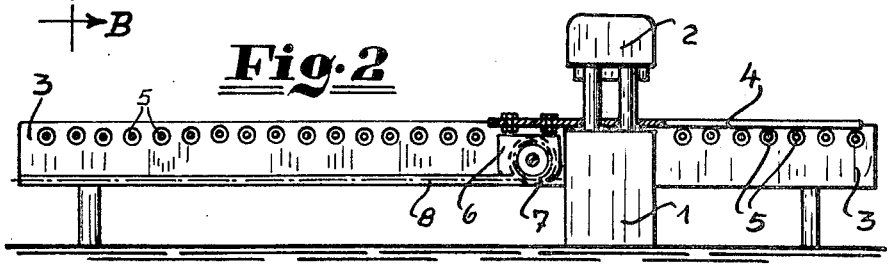
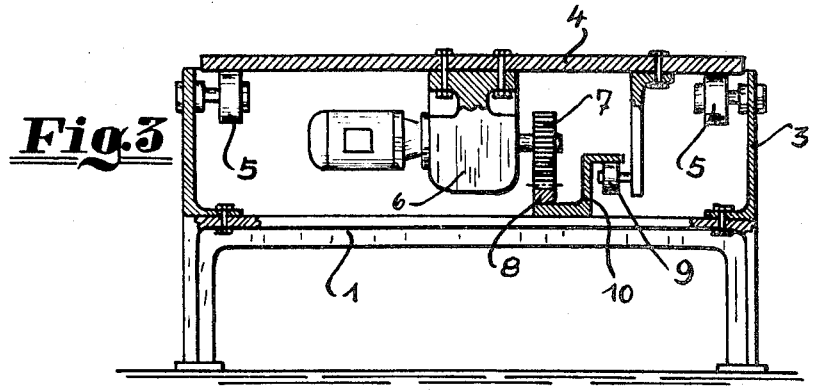
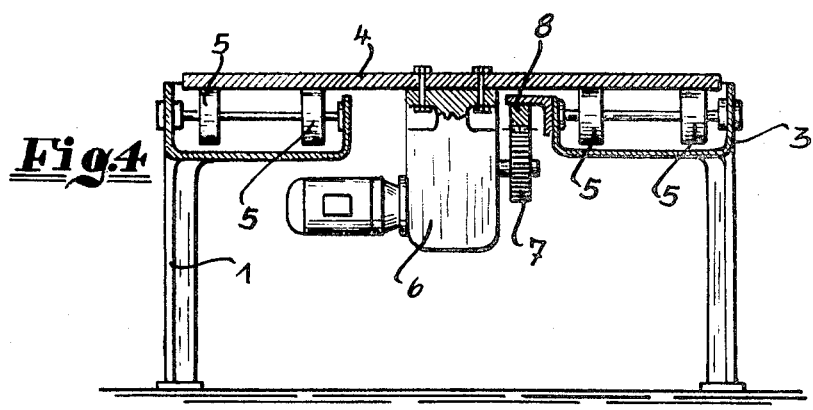
INVENTOR
WERNER GOLTER
HELMBRECHT MULLER
BY Friedman & Goodman
ATTORNEYS

LARGE AREA OR CROSS-BEAM CUTTING MACHINE

BACKGROUND OF THE INVENTION

1. Field of the Invention

This invention relates to an improved large area or crossbeam cutting machine of the type comprising a table-guiding frame provided with a crossbeam, a table displaceable along the guiding frame and a drive unit therefor, the power takeoff element of which interacts with an elongated drive element.

2. Description of the Prior Art

Large area or crossbeam cutting machines comprising a table-guiding frame provided with a crossbeam, a table displaceable along the guiding frame and a drive unit therefor, the power takeoff element of which interacts with an elongated drive element, are known. Generally, the table, supported on rollers, rests on the guiding frame. The frame and the table are so dimensioned that the table can be moved to a position underneath the crossbeam, or a portion of its length can even move past it. For this purpose conventional cutting machines are equipped with a drag chain attached to the underside of the table and journaled onto the frame. There is also known an arrangement employing a toothed rack, which meshes with a drive pinion. The rack is attached to the table, while the drive unit with its pinion is supported in the frame.

Chains and racks are relatively simple drive means but they suffer from certain shortcomings. In conjunction with very long tables, chains acquire a certain slack, as a result of stretching, which imparts to them a tendency to swing. When this happens, the table is liable to move in spurts. Rack-and-pinion drive is free from this disadvantage. However, it does have a shortcoming of its own in that the table must not be significantly shorter than the frame otherwise the rack may easily move out of engagement with the pinion journaled in the table-guiding frame.

Productional reasons may dictate, however, that the length of the guide frame along which the table moves be substantially greater than that of the rack-carrying table itself.

SUMMARY OF THE INVENTION

It is, therefore, among one of the principal objectives of the invention to overcome these aforementioned prior art disadvantages.

The present invention provides for the drive unit to be placed on the movable table, and the longitudinal drive element, which interacts therewith is arranged on the guide frame. For example, in accord with the invention, if the motor is provided with a pinion, and a rack is attached to the guide frame, all limitations concerning the relative lengths of the table and its frame are eliminated.

In this instance, the transmission of the motor is anchored to the underside of the table and its pinion meshes with a rack secured to the upper surface of the guide frame. In response to the power exerted by the drive unit, the pinion then has the tendency to jump out of engagement with the toothed rack. This is prevented by a roller arranged on the drive unit, and by a guide rail attached to the rack, the roller running along the underside of the rail when the pinion engages the rack teeth from above.

In another embodiment, the rack is so mounted on the frame that its teeth point downwardly and the pinion engages from underneath.

The inventive principle can be applied equally well in conjunction with a friction wheel drive. Similarly to the rack-and-pinion drive, use can also be made of a chain-and-sprocket drive. In the case of a friction wheel, the longitudinal drive element is a level, smooth and elongated surface, while in the case of a chain-and-sprocket drive, a long chain is attached to the frame.

DESCRIPTION OF THE DRAWING

The invention will now be described in greater detail with the aid of several embodiments and with reference to the appended drawing, in which:

FIG. 1 shows a crossbeam cutting machine with its working table in its initial position;

FIG. 2 is the same machine with the table in its working position;

FIG. 3 is a section taken along line A-B of FIG. 1 in the direction of the arrows;

FIG. 4 is a sectional view similar to FIG. 3 showing yet another embodiment of the invention.

DESCRIPTION OF THE PREFERRED EMBODIMENTS

In the figures, in which like parts are identified by like reference numerals, the large area crossbeam cutting machine comprises a pedestal 1 supporting a crossbeam 2. The latter carries the necessary conventional tools and, when executing a downward stroke towards the pedestal 1, carries out the cutting movement. As a result thereof, a workpiece is cut out of the material supported by table 4 and moved therewith underneath the crossbeam 2 (FIG. 2).

The operation of machines of this type is well known and thus requires no further explanation. Table 4 moves on rollers 5 journaled in guide frame 3.

In accordance with the invention, a drive unit is secured to one extremity of the table 4, in this case the left end; the drive unit 6 comprises a drive motor and a gear system. A stub axle of the drive unit 6 carries a pinion 7 while guide frame 3 supports a toothed rack 8.

With drive unit 6 engaged, table 4 moves along its frame 3. The material resting on table 4 moves with it and arrives under the crossbeam 2 where the workpieces are cut out therefrom. The cutting strokes of the crossbeam cutter and the advancing movements of the table follow each other until all the material on the table 4 is used up. The table then returns to its initial position (FIG. 1). This latter phase of operation, too, is identical with that of prior art machines, except that now the drive unit 6 travels with the moving table 4 and the toothed rack 8 is supported by the guide frame 3.

The embodiments shown in FIGS. 3 and 4 differ from each other in that in the one embodiment (FIG. 3) the teeth of rack 8 point upwardly and in the other (FIG. 4) are turned downward. Since, in the configuration shown in FIG. 3, the pinion 7, in response to pressure exerted by the drive unit, has a tendency to lift out of engagement with rack 8, a uniform gap is maintained between the table 4 with drive unit 6 attached thereto and frame 3 with the rack 8 by an arrangement comprising a guide rail 10 on rack 8 and a roller 9 journaled on table 4, the roller engaging the underside of the rail.

In the embodiment shown in FIG. 4, the same objective is attained in a different way. No separate guide rail and roller arrangement is needed here. Pinion 7 engages the rack from underneath, the teeth of the latter facing downwardly.

The motor of the drive unit can be an electric, a hydraulic, or a compressed air motor.

What we claim is:

1. In a large area or crossbeam cutting machine including a table-guiding frame with a crossbeam, a table movable along the frame and a drive unit therefor provided with a power takeoff, the power takeoff of the drive unit interacting with a longitudinal drive element, the improvement comprising said drive unit being disposed on said movable table so as to move in conjunction therewith and said longitudinal drive element being disposed on said table frame, said drive unit being secured to an underside of said table, said drive element being secured to an upper surface of said frame, said drive unit being provided with drive means disposed above said drive element for engaging said drive element, a roller associated with said drive unit, a guide rail associated with said drive element, said roller engaging an underside of said rail to maintain said drive means in engagement with said drive element when said drive means engages from above with said drive element.

2. A large area or crossbeam cutting machine according to claim 1, wherein said drive unit is affixed at one extremity of said table.

3. A large area or crossbeam cutting machine according to claim 1, wherein said drive means includes a pinion and said drive element includes a toothed rack.

4. A large area or crossbeam cutting machine according to claim 1, wherein said drive means includes a friction wheel drive.

5. A large area or crossbeam cutting machine according to claim 3, wherein said drive means includes a chain-and-sprocket drive.

6. In a large area or crossbeam cutting machine including a table-guiding frame with a crossbeam, a table movable along the frame and a drive unit therefor provided with a power takeoff, the power takeoff of the drive unit interacting with a longitudinal drive element, the improvement comprising said drive unit being disposed on said movable table so as to move in conjunction therewith and said longitudinal drive element being disposed on said table frame, said drive unit being secured to an underside of said table, said drive element being secured to an upper surface of said frame, said drive unit being provided with drive means disposed below said drive element for engaging said drive element, said drive unit exerting an upward pressure on said drive means to maintain said drive means in engagement with said drive element when said drive means engages from below with said drive element.

7. A large area or crossbeam cutting machine according to claim 6, wherein said drive unit is affixed at one extremity of said table.

8. A large area or crossbeam cutting machine according to claim 6, wherein said drive means includes a pinion and said drive element includes a toothed rack.

9. A large area or crossbeam cutting machine according to claim 6, wherein said drive means includes a friction wheel drive.

10. A large area or crossbeam cutting machine according to claim 6, wherein said drive means includes a chain-and-sprocket drive.

11. In a large area or crossbeam cutting machine including a table-guiding frame with a crossbeam, a table movable along the frame and a drive unit therefor provided with a power takeoff, the power takeoff of the drive unit interacting with a longitudinal drive element, the improvement which comprises disposing said drive unit on said movable table so as to move in conjunction therewith and positioning said longitudinal drive element on said table frame, said drive unit being affixed on said table and being provided with a pinion, a toothed rack being attached to said table frame, said drive unit being attached to an underside of said table, said pinion meshing with the teeth of said rack, said rack being attached to the upper surface of said frame, a roller being associated with said drive unit, a guide rail being associated with said rack, said roller engaging an underside of said rail when said pinion meshes from above with the teeth of said rack.

12. In a large area or crossbeam cutting machine including a table-guiding frame with a crossbeam, a table movable along the frame and a drive unit therefor provided with a power takeoff, the power takeoff of the drive unit interacting with a longitudinal drive element, the improvement which comprises disposing said drive unit on said movable table so as to move in conjunction therewith and positioning said longitudinal drive element on said table frame, said drive unit being affixed on said table and being provided with a pinion, a toothed rack being attached to said table frame, said drive unit being attached to an underside of said table, said pinion meshing with the teeth of said rack, said rack being attached to the upper surface of said frame, said rack being mounted on said table frame so that its teeth point downwardly and said pinion engages said rack from below.